(12) United States Patent
Koo et al.

(10) Patent No.: US 11,240,536 B2
(45) Date of Patent: Feb. 1, 2022

(54) METHOD AND DEVICE FOR ENTROPY ENCODING, DECODING VIDEO SIGNAL

(71) Applicant: LG Electronics Inc., Seoul (KR)

(72) Inventors: Moonmo Koo, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/605,101

(22) PCT Filed: Apr. 9, 2018

(86) PCT No.: PCT/KR2018/004143
§ 371 (c)(1),
(2) Date: Oct. 14, 2019

(87) PCT Pub. No.: WO2018/190594
PCT Pub. Date: Oct. 18, 2018

(65) Prior Publication Data
US 2020/0396488 A1 Dec. 17, 2020

Related U.S. Application Data

(60) Provisional application No. 62/484,899, filed on Apr. 13, 2017.

(51) Int. Cl.
*H04N 19/91* (2014.01)
*H04N 19/129* (2014.01)
(Continued)

(52) U.S. Cl.
CPC .......... *H04N 19/91* (2014.11); *H04N 19/129* (2014.11); *H04N 19/13* (2014.11); *H04N 19/18* (2014.11); *H04N 19/70* (2014.11)

(58) Field of Classification Search
None
See application file for complete search history.

(56) References Cited

U.S. PATENT DOCUMENTS 9,699,479 B2 * 7/2017 Ikai ...................... H04N 19/513
9,918,090 B2 * 3/2018 George ................. H04N 19/13
(Continued)

FOREIGN PATENT DOCUMENTS

AU 2013211004 A1 * 9/2014 ............. H04N 19/91
CN 104093020 10/2014
(Continued)

OTHER PUBLICATIONS

Extended European Search Report in European Appln. No. 18784463.4, dated Jul. 20, 2020, 7 pages.
(Continued)

*Primary Examiner* — Chikaodili E Anyikire
(74) *Attorney, Agent, or Firm* — Fish & Richardson P.C.

(57) ABSTRACT

The present disclosure provides a method for decoding a video signal, the method comprising the steps of: decoding, from a bitstream, a syntax element indicating the last non-zero region, wherein the last non-zero region represents a region including the last non-zero transform coefficient in a scan order; splitting a current block into multiple sub-regions; and based on the syntax element, determining the last non-zero region of the current block among the split sub-regions.

13 Claims, 9 Drawing Sheets

(51) Int. Cl.
*H04N 19/13* (2014.01)
*H04N 19/18* (2014.01)
*H04N 19/70* (2014.01)

(56) References Cited

U.S. PATENT DOCUMENTS

| | | | |
|---|---|---|---|
| 10,291,912 B2* | 5/2019 | He | H04N 19/176 |
| 2013/0215969 A1 | 8/2013 | Fang et al. | |
| 2014/0064365 A1 | 3/2014 | Wang et al. | |
| 2014/0314149 A1 | 10/2014 | Cheon et al. | |
| 2016/0080749 A1* | 3/2016 | He | H04N 19/13 375/240.02 |
| 2016/0360238 A1 | 12/2016 | George et al. | |
| 2017/0078702 A1 | 3/2017 | Ikai et al. | |

FOREIGN PATENT DOCUMENTS

| | | | |
|---|---|---|---|
| CN | 104270641 | 1/2015 | |
| CN | 105791846 | 7/2016 | |
| CN | 107517384 A * | 12/2017 | H04N 19/174 |
| JP | 2013187869 | 9/2013 | |
| JP | 2017507519 | 3/2017 | |
| KR | 1020130095309 | 8/2013 | |
| KR | 1020130116754 | 10/2013 | |
| KR | 1020140120891 | 10/2014 | |
| KR | 1020150016263 | 2/2015 | |
| KR | 1020150064165 | 6/2015 | |
| KR | 1020160038063 | 4/2016 | |
| RU | 2609750 C1 | 2/2017 | |
| WO | WO13099892 | 7/2013 | |
| WO | WO2013157769 | 10/2013 | |
| WO | WO-2017043763 A1 * | 3/2017 | H04N 19/18 |

OTHER PUBLICATIONS

Hsu et al., "Input Document to JCT-VC," JCTVC-H0284, Joint Collaborative Team on Video Coding (JCT-VC) of ITU-T SG16 WP3 and ISO/IEC JTC1/SC29/WG11, 8$^{th}$ Meeting: San Jose, CA, USA, Feb. 1-10, 2012, 11 pages.

Puri et al., "Improved coefficient coding for adaptive transforms in HEVC," IEEE, Dec. 2016, 5 pages.
Wang et al., "Transform Coefficient Coding Design for AVS2 Video Coding Standard," IEEE, Nov. 2013, 6 pages.
Chen et al., "Algorithm Description of Joint Exploration Test Model 5," JVET-E1001-v1, Presented at Joint Video Exploration Team (JVET) of ITU-T SG 16 WP 3 and ISO/IEC JTC 1/SC 29/WG 11, 5$^{th}$ Meeting: Geneva, CH, Jan. 12-20, 2017, 6 pages.
International Telecommunication Union, "Series H: Audiovisual and Multimedia Systems, Infrastructure of audiovisual services—Coding of moving video," H.265, Dec. 2016, 664 pages.
JP Office Action in Japanese Appln. No. 2019-556190, dated Aug. 10, 2021, 11 pages (with English translation).
Sole et al., "Reduced complexity 32×32 transform by coefficient zero-out," JCTVC-C237, Presented at Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, 4 pages.
Chinese Office Action in Chinese Appln. No. 201880031914.0, dated Apr. 22, 2021, 20 pages (with English translation).
PCT International Search Report in International Appln. No. PCT/KR2018/004143, dated Jul. 26, 2018, 12 pages (with English translation).
Russian Office Action in Russian Appln. No. 2019135694, dated May 20, 2020, 14 pages (with English translation).
Korean Notice of Allowance in Korean Appln. No. 10-2019-7033090, dated May 20, 2020, 5 pages (with English translation).
Japanese Office Action in Japanese Appln. No. 2019-556190, dated Dec. 22, 2020, 10 pages (with English translation).
Telecommunication Standardization Sector of ITU, "Series H: Audiovisual and Multimedia Systems Infrastructure of audiovisual services—Coding of moving video, High efficiency video coding," H.265, Dec. 2016, 664 pages.
Tzu-Der Chuang et al., "Non-CE1: Codeword reordering for last_significant_coeff_x and last_significant_coeff_y," Joint Collaborative Team on Video Coding (JCT-VC) of ITU-T SG16 WP3 and ISO/IEC JTC1/SC29/WG11 7th Meeting:, JCTVC-G201, Geneva, CH, Nov. 21-30, 2011, 3 pages.
RU Notice of Allowance in Russian Appln. No. 2020129540, dated May 20, 2021, 16 pages (with English translation).

* cited by examiner

100 # METHOD AND DEVICE FOR ENTROPY ENCODING, DECODING VIDEO SIGNAL

CROSS-REFERENCE TO RELATED APPLICATIONS

This application is a National Stage application under 35 U.S.C. § 371 of International Application No. PCT/KR2018/004143, filed on Apr. 9, 2018, which claims the benefit of U.S. Provisional Application No. 62/484,899, filed on Apr. 13, 2017. The disclosures of the prior applications are incorporated by reference in their entirety.

TECHNICAL FIELD

The present disclosure relates to a method for entropy-encoding and entropy-decoding video signals. More specifically, the disclosure relates to a method and device for encoding and decoding the position of a last non-zero coefficient when transform coefficients are coded.

BACKGROUND ART

Entropy coding is a process of non-compressive compressing syntax elements determined through encoding process and generating Raw Byte Sequence Payload (RBSP). The entropy coding uses statistics of syntax and allocates a short bit for the syntax frequently generated and allocates a long bit for other syntax, and then expresses the syntax elements into brief data.

Among these, Context-based Adaptive Binary Arithmetic Coding (CABAC) uses an adaptively updated context model based on the context of syntax and the symbol previously generated during the process of performing binary arithmetic coding. However, the CABAC has many operations and high complexity, and sequential structure, and accordingly, has a difficulty in parallel operation.

Accordingly, in a video compression technique, it is required to compress and transmit a syntax element more efficiently, and for this, it is required to improve performance of entropy coding.

DISCLOSURE

Technical Problem

An object of the present disclosure is to provide a method for coding a region to which a last non-zero transform coefficient belongs from among regions obtained by dividing a transform unit.

In addition, an object of the present disclosure is to provide a method for coding a region to which a last non-zero transform coefficient belongs from among regions obtained by recursively dividing a transform unit.

Further, an object of the present disclosure is to provide a method for coding the position of a last non-zero coefficient while adaptively changing a coding method.

Further, an object of the present disclosure is to provide a method for coding the position of a last non-zero coefficient by applying different coding methods depending on various conditions.

Further, an object of the present disclosure is to provide a method for coding the position of a last non-zero coefficient in consideration of a case in which the presence of the position of the last non-zero coefficient in a limited region is guaranteed.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method for decoding a video signal may include: decoding, from a bitstream, a syntax element indicating a last non-zero region, the last non-zero region representing a region including a last non-zero transform coefficient in a scan order; dividing a current block into a plurality of sub-regions; and determining a last non-zero region of the current block from among the divided sub-regions based on the syntax element.

Preferably, the method may further include decoding index information indicating the position of the last non-zero transform coefficient in the last non-zero region of the current block.

Preferably, the dividing of the current block into the plurality of sub-regions may include dividing the current block into the plurality of sub-regions by recursively dividing the current block into regions with lower depths based on a predetermined division method.

Preferably, the syntax element may include information indicating, for each depth, a region including the last non-zero transform coefficient from among the regions with lower depths divided from the current block.

Preferably, the dividing of the current block into the plurality of sub-regions may include grouping the width of the current block into a plurality of horizontal groups and grouping the height of the current block into a plurality of vertical groups, wherein the current block is divided into the plurality of sub-regions based on the horizontal groups and the vertical groups.

Preferably, the syntax element may include information on a horizontal group or a vertical group indicating the last non-zero region from among the horizontal groups or the vertical groups.

Preferably, the method may further include decoding a syntax element indicating the position of the last non-zero transform coefficient in the last non-zero region of the current block, wherein the syntax element indicating the last non-zero region is binarized using truncated unary code and the syntax element indicating the position of the last non-zero transform coefficient is binarized using fixed length code.

Preferably, the syntax element indicating the last non-zero region may be decoded in a regular mode using a context and the syntax element indicating the position of the last non-zero transform coefficient may be decoded in a bypass mode which does not use a context.

Preferably, the method may further include adaptively determining a parameter set applied to the current block from among prestored parameter sets, wherein the parameter set includes at least one of a parameter indicating the number of horizontal groups or vertical groups, a parameter indicating the length of code allocated to each group, and a parameter indicating a context index used for code allocated to each group.

Preferably, the adaptively determining of a parameter set applied to the current block may include determining a parameter set applied to the current block based on a probability distribution of the position of the last non-zero transform coefficient.

Preferably, the current block may be divided into sub-regions composed of a specific number of pixels when the current block is a non-square block, wherein the specific number is determined depending on the ratio of the width to the height of the current block.

Preferably, when the last non-zero transform coefficient is present within a specific region of the current block, the syntax element may be binarized using truncated unary code allocated within the range of the specific region.

In another aspect of the present disclosure, a device for decoding a video signal may include: a syntax element decoding unit for decoding, from a bitstream, a syntax element indicating a last non-zero region, the last non-zero region representing a region including a last non-zero transform coefficient in a scan order; a sub-region segmentation unit for dividing a current block into a plurality of sub-regions; and a last non-zero region determination unit for determining a last non-zero region of the current block from among the divided sub-regions based on the syntax element.

Advantageous Effects

According to embodiments of the present disclosure, it is possible to reduce the amount of data necessary to signal transform coefficients by effectively coding positional information of the last non-zero coefficient.

It will be appreciated by persons skilled in the art that the effects that could be achieved with the present disclosure are not limited to what has been particularly described hereinabove and the above and other effects that the present disclosure could achieve will be more clearly understood from the following detailed description.

MODE FOR INVENTION

Hereinafter, exemplary elements and operations in accordance with embodiments of the present disclosure are described with reference to the accompanying drawings. It is however to be noted that the elements and operations of the present disclosure described with reference to the drawings are provided as only embodiments and the technical spirit and kernel configuration and operation of the present disclosure are not limited thereto.

In addition, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present disclosure should not be construed as being based on only the name of a term used in a corresponding description of this specification and that the present disclosure should be construed by checking even the meaning of a corresponding term.

Furthermore, terms used in the present disclosure are common terms selected to describe the disclosure, but may be replaced with other terms for more appropriate analysis if such terms having similar meanings are present. For example, a signal, data, a sample, a picture, a frame, and a block may be properly replaced and interpreted in each coding process.

In addition, the concepts and the methods described in the present disclosure may be applied to other embodiments, and the combination of the embodiments is also applicable within the inventive concept of the present disclosure although it is not explicitly described in the present disclosure.

Figure 1:
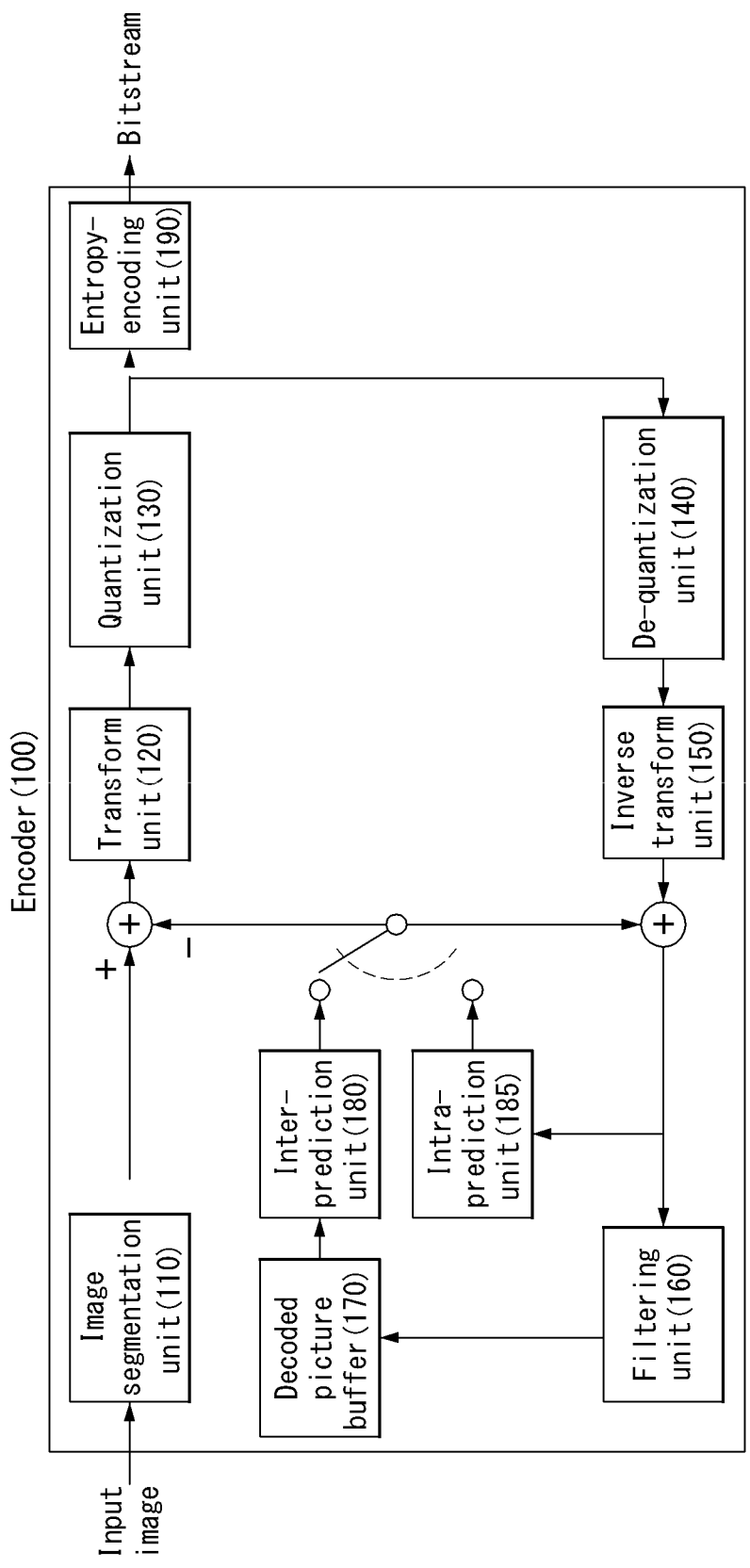
FIG. 1 is a block diagram illustrating a configuration of an encoder for encoding a video signal according to an embodiment of the present disclosure.

FIG. 1 shows a schematic block diagram of an encoder for encoding a video signal, in accordance with one embodiment of the present disclosure.

Referring to FIG. 1, an encoder 100 may include an image segmentation unit 110, a transform unit 120, a quantization unit 130, a de-quantization unit 140, an inverse transform unit 150, a filtering unit 160, a DPB (Decoded Picture Buffer) 170, an inter-prediction unit 180, an intra-prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

The encoder 100 may generate a residual signal by subtracting a prediction signal output from the inter-prediction unit 180 or intra prediction unit 185 from the input image signal. The generated residual signal may be transmitted to the transform unit 120.

The transform unit 120 may apply a transform technique to the residual signal to produce a transform coefficient. For example, the transform technique may include at least one of Discrete Cosine Transform (DCT), Discrete Sine Transform (DST), Karhunen-Loéve Transform (KLT), Graph-Based Transform (GBT), or Conditionally Non-linear Transform (CNT). When GBT represents the relation information between pixels as a graph, the GBT means a transform obtained from the graph. CNT means a transform by generating a prediction signal by using all previously reconstructed pixel and obtained based on it. In addition, the transform process may be applied to a pixel block having the same size of a square, or to a block of a variable size other than a square.

The quantization unit 130 may quantize the transform coefficient and transmits the quantized coefficient to the entropy-encoding unit 190. The entropy-encoding unit 190 may entropy-code the quantized signal and then output the entropy-coded signal as bitstreams.

The quantized signal output from the quantization unit 130 may be used to generate a prediction signal. For example, the quantized signal may be subjected to a de-quantization and an inverse transform via the de-quantization unit 140 and the inverse transform unit 150 in the loop respectively to reconstruct a residual signal. The reconstructed residual signal may be added to the prediction signal output from the inter-prediction unit 180 or intra-prediction unit 185 to generate a reconstructed signal.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction. In this case, in order to reduce the amount of motion information transmitted from the inter-prediction mode, the motion information may be predicted based on correlation of motion information between a neighboring block and a current block.

The intra-prediction unit 185 may predict a current block by referring to samples in the vicinity of a block to be encoded currently. The intra-prediction unit 185 may perform a following procedure to perform intra prediction. First, the intra-prediction unit 185 may prepare reference samples needed to generate a prediction signal. Then, the intra-prediction unit 185 may generate the prediction signal using the prepared reference samples. Thereafter, the intra-prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction.

The prediction signal generated via the inter-prediction unit 180 or the intra-prediction unit 185 may be used to generate the reconstructed signal or used to generate the residual signal.

Figure 2:
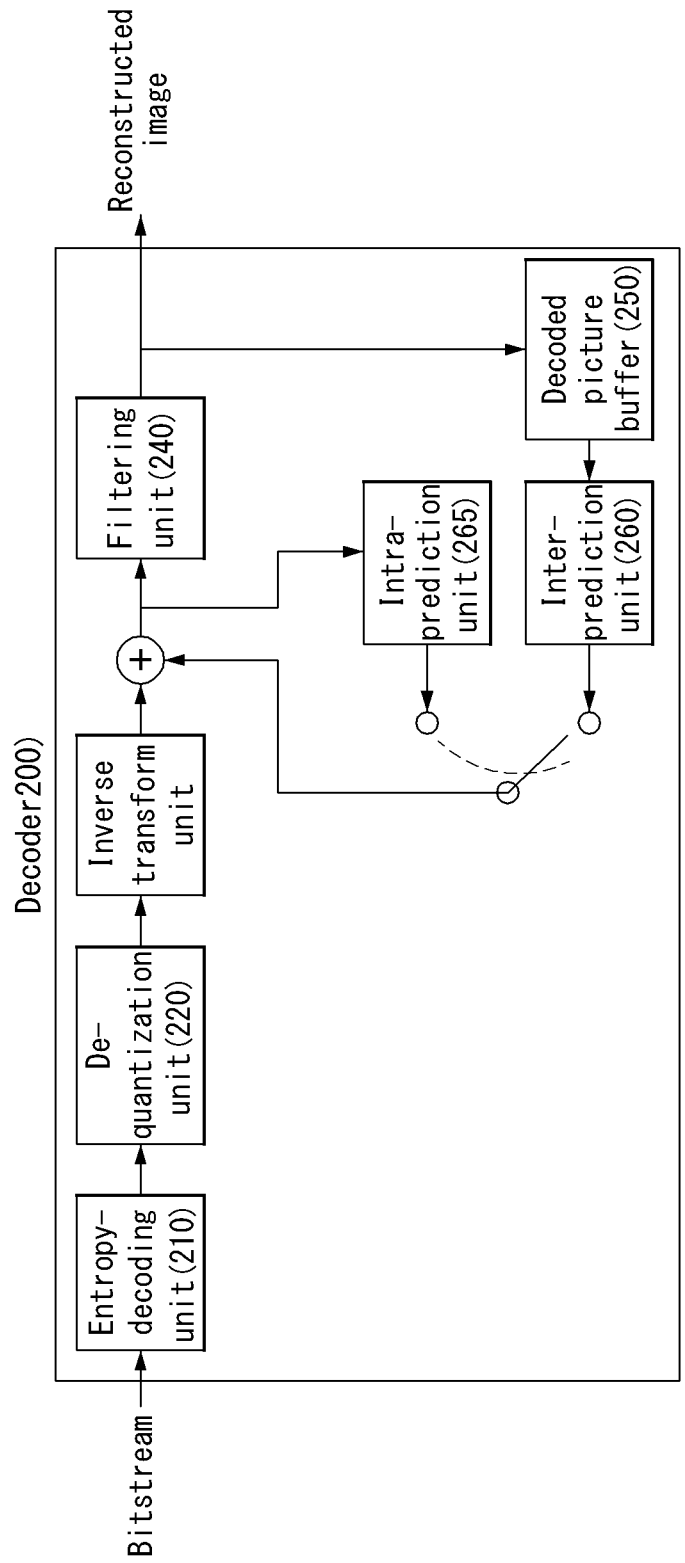
FIG. 2 is a block diagram illustrating a configuration of a decoder for decoding a video signal according to an embodiment of the present disclosure.

FIG. 2 shows a schematic block diagram of a decoder for decoding a video signal, in accordance with one embodiment of the present disclosure.

Referring to FIG. 2, a decoder 200 may include an entropy-decoding unit 210, a de-quantization unit 220, an inverse transform unit 230, a filtering unit 240, a decoded picture buffer (DPB) 250, an inter-prediction unit 260 and an intra-prediction unit 265.

A reconstructed video signal output from the decoder 200 may be reproduced using a reproducing device.

The decoder 200 may receive the signal output from the encoder as shown in FIG. 1. The received signal may be entropy-decoded via the entropy-decoding unit 210.

The de-quantization unit 220 may obtain a transform coefficient from the entropy-decoded signal using quantization step size information.

The inverse transform unit 230 may inverse-transform the transform coefficient to obtain a residual signal.

A reconstructed signal may be generated by adding the obtained residual signal to the prediction signal output from the inter-prediction unit 260 or the intra-prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter-prediction unit 260.

Herein, detailed descriptions for the filtering unit 160, the inter-prediction unit 180 and the intra-prediction unit 185 of the encoder 100 may be equally applied to the filtering unit 240, the inter-prediction unit 260 and the intra-prediction unit 265 of the decoder 200 respectively.

Figure 3:
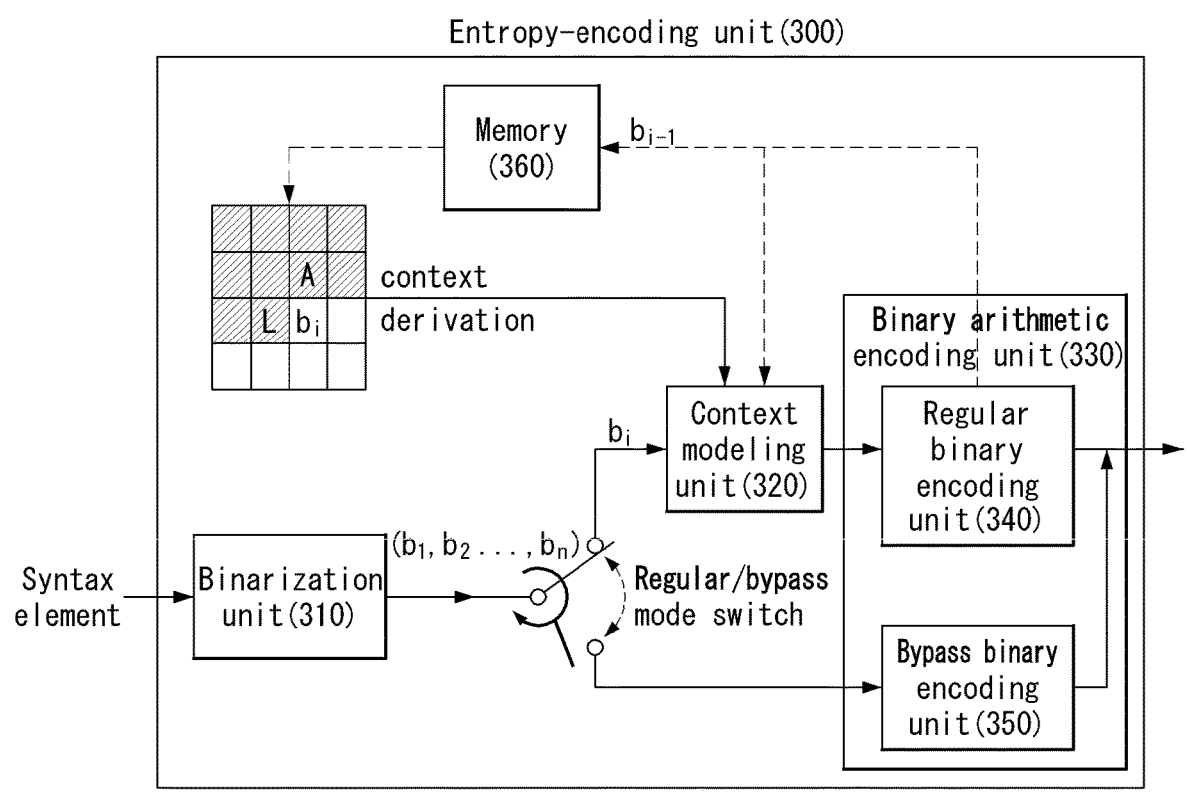
FIG. 3 illustrates a schematic block diagram of an entropy-encoding unit to which Context-based Adaptive Binary Arithmetic Coding (CABAC) is applied, as an embodiment to which the present disclosure is applied.

FIG. 3 illustrates a schematic block diagram of an entropy-encoding unit to which Context-based Adaptive Binary Arithmetic Coding (CABAC) is applied, as an embodiment to which the present disclosure is applied.

An entropy-encoding unit 300, to which the present disclosure is applied, includes a binarization unit 310, a context modeling unit 320, a binary arithmetic encoding unit 330 and a memory 360, and the binary arithmetic encoding unit 330 includes a regular binary encoding unit 340 and a bypass binary encoding unit 350. Here, the regular binary encoding unit 340 and the bypass binary encoding unit 350 may be called as a regular coding engine and a bypass coding engine, respectively.

The binarization unit 310 may receive a sequence of data symbols and perform binarization thereon to output a binary symbol (bin) string including a binarized value of 0 or 1. The binarization unit 310 may map syntax elements to binary symbols. Various different binarization processes, e.g., unary (U), truncated unary (TU), k-order Exp-Golomb (EGk), and fixed length processes, and the like, may be used for binarization. The binarization process may be selected based on a type of a syntax element.

The output binary symbol string is transmitted to the context modeling unit 320.

The context modeling unit 320 selects probability information necessary to code a current block from a memory and transmits the probability information to the binary arithmetic encoding unit 330. For example, the context modeling unit 320 can select a context memory from the memory 360 based on a syntax element to be coded and select probability information necessary for current syntax element coding through a bin index binIdx. Here, a context refers to information about a symbol generation probability and context modeling refers to a process of estimating a probability necessary for binary arithmetic coding of the next bin from information about previously coded bins. In addition, a context can be composed of a state indicating a specific probability value and a most probable symbol (MPS).

The context modeling unit 320 can provide correct probability estimation necessary to achieve high coding efficiency. Accordingly, different context models can be used for different binary symbols and a probability of such context models can be updated based on previously coded binary symbol values.

Binary symbols having similar distributions can share the same context model. For probability estimation of a context model for each binary symbol, at least one of syntax information of a bin, a bin index binIdx indicating the position of a bin in a bin string, a probability of a bin included in a neighboring block of a block containing a bin, and a decoding value of a specific syntax element of the neighboring block can be used.

The binary arithmetic encoding unit 330 includes a regular binary encoding unit 340 and a bypass binary encoding unit 350, and performs entropy-encoding on the output string and outputs compressed data bits.

The regular binary encoding unit 340 performs arithmetic coding based on recursive interval division.

First, an interval (or a section or a range) having an initial value of 0 to 1 is divided into two sub-intervals based on a binary symbol probability. Encoded bits provide an offset by which one of intervals indicating 0 and 1 can be selected in a process of continuously decoding binary symbol values when transformed into binary decimals.

After a binary symbol of a decoded mode, the aforementioned interval can be updated such that selected sub-intervals become identical and the interval division process is repeated. The aforementioned interval and offset have limited bit precision and thus renormalization may be required in order to maintain the precision whenever the interval decreases to below a specific value (i.e., in order to prevent the value from excessively decreasing and being incorrectly represented or from becoming zero and being lost). The renormalization may occur after each binary symbol is encoded or decoded.

The bypass binary encoding unit 350 performs encoding without a context mode, and performs coding by fixing probability of a currently coded bin to 0.5. This may be used when it is difficult to determine a probability of syntax or it is designed to code with high speed.

Figure 4:
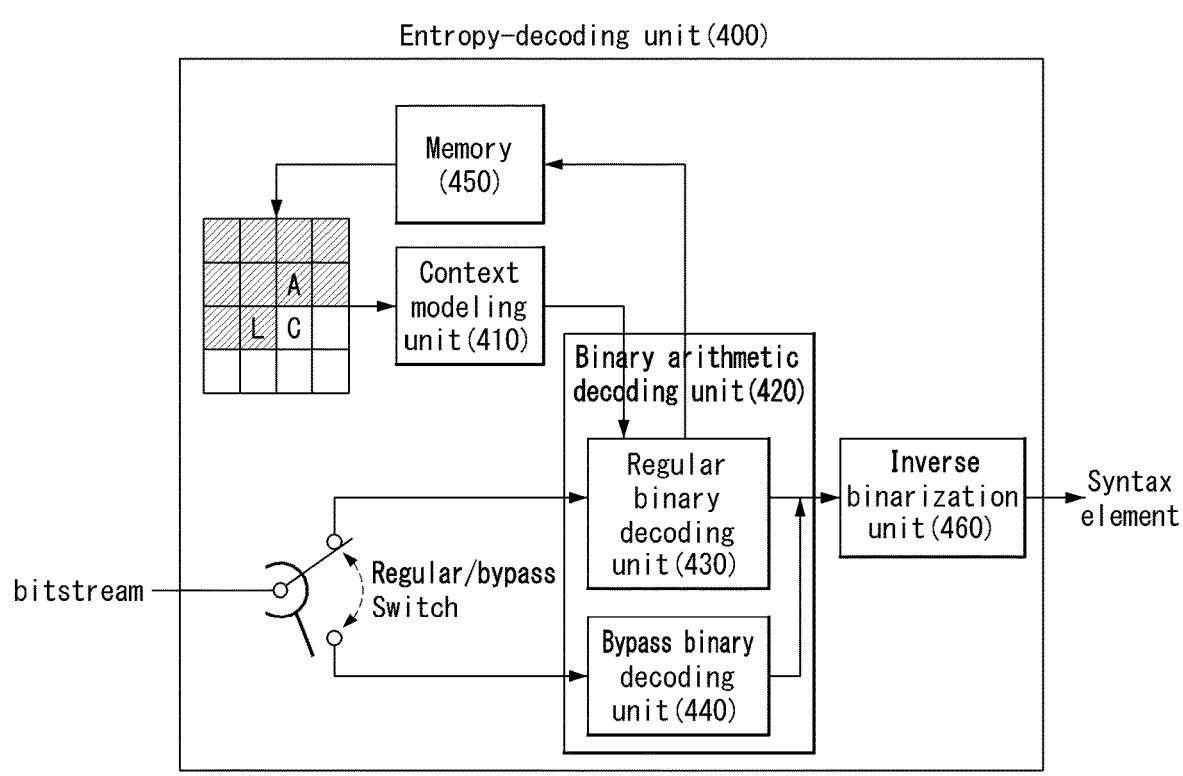
FIG. 4 illustrates a schematic block diagram of an entropy-decoding unit to which Context-based Adaptive Binary Arithmetic Coding (CABAC) is applied, as an embodiment to which the present disclosure is applied.

FIG. 4 illustrates a schematic block diagram of an entropy-decoding unit to which Context-based Adaptive Binary Arithmetic Coding (CABAC) is applied, as an embodiment to which the present disclosure is applied.

An entropy-decoding unit 400 includes a context modeling unit 410, a binary arithmetic decoding unit 420, a memory 450 and an inverse binarization unit 460, and the binary arithmetic decoding unit 420 includes a regular binary decoding unit 430 and a bypass binary decoding unit 440.

The entropy decoding unit 400 receives a bitstream and checks whether a bypass mode is applied to a current syntax element. Here, the bypass mode refers to fixing a probability of a currently coded bin to 0.5 and performing coding without using a context model. When the bypass mode is not applied, the regular binary decoding unit 430 performs binary arithmetic decoding according to a regular mode.

Here, the context modeling unit 410 selects probability information necessary to decode a current bitstream from the memory 450 and transmits the probability information to the regular binary decoding unit 430.

On the other hand, when the bypass mode is applied, the bypass binary decoding unit 440 performs binary arithmetic decoding according to the bypass mode.

The inverse binarization unit 460 receives a decoded bin in the form of binary from the binary arithmetic decoding unit 420, converts the bin into a syntax element value in the form of integer and outputs the syntax element value. When a bin or a bin string in the form of binary is a syntax element mapped to a syntax element value, the inverse binarization unit 460 may output the bin in the form of binary as intact.

Figure 5:
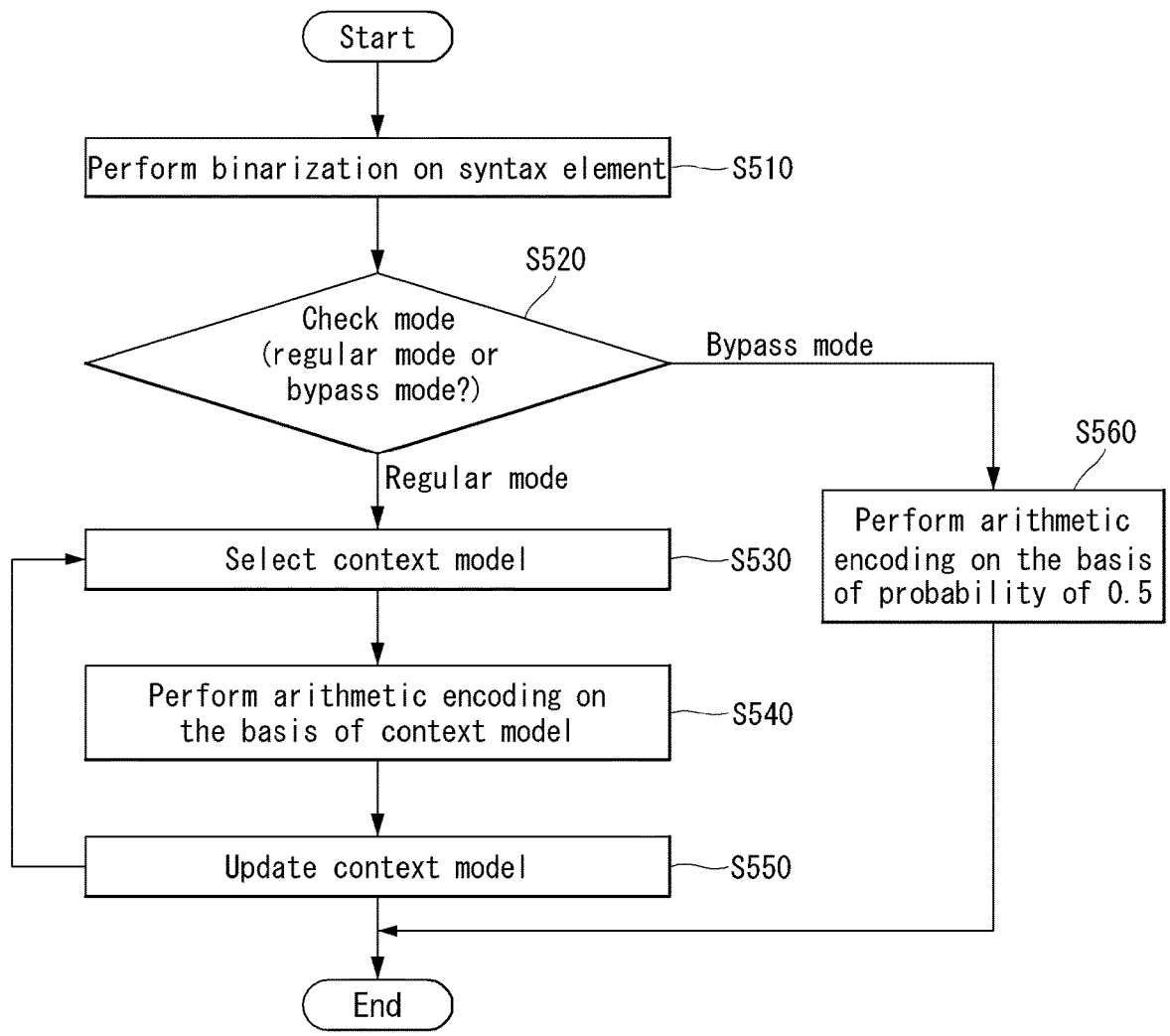
FIG. 5 illustrates an encoding flowchart performed according to Context-based Adaptive Binary Arithmetic Coding (CABAC), as an embodiment to which the present disclosure is applied.

FIG. 5 illustrates an encoding flowchart performed according to Context-based Adaptive Binary Arithmetic Coding (CABAC), as an embodiment to which the present disclosure is applied.

An encoder may perform a binarization for a syntax element (step, S510).

The encoder may check whether to perform a binary arithmetic coding according to the regular mode or perform a binary arithmetic coding according to the bypass mode (step, S520).

In the regular mode, the encoder can select a context model (S530) and perform binary arithmetic encoding based on the context model (S540). In addition, the encoder can update the context model (S550) and select a suitable context model again based on the context model updated in step S530.

In the bypass mode, the encoder can perform binary arithmetic encoding based on probability of 0.5 (S560).

Figure 6:
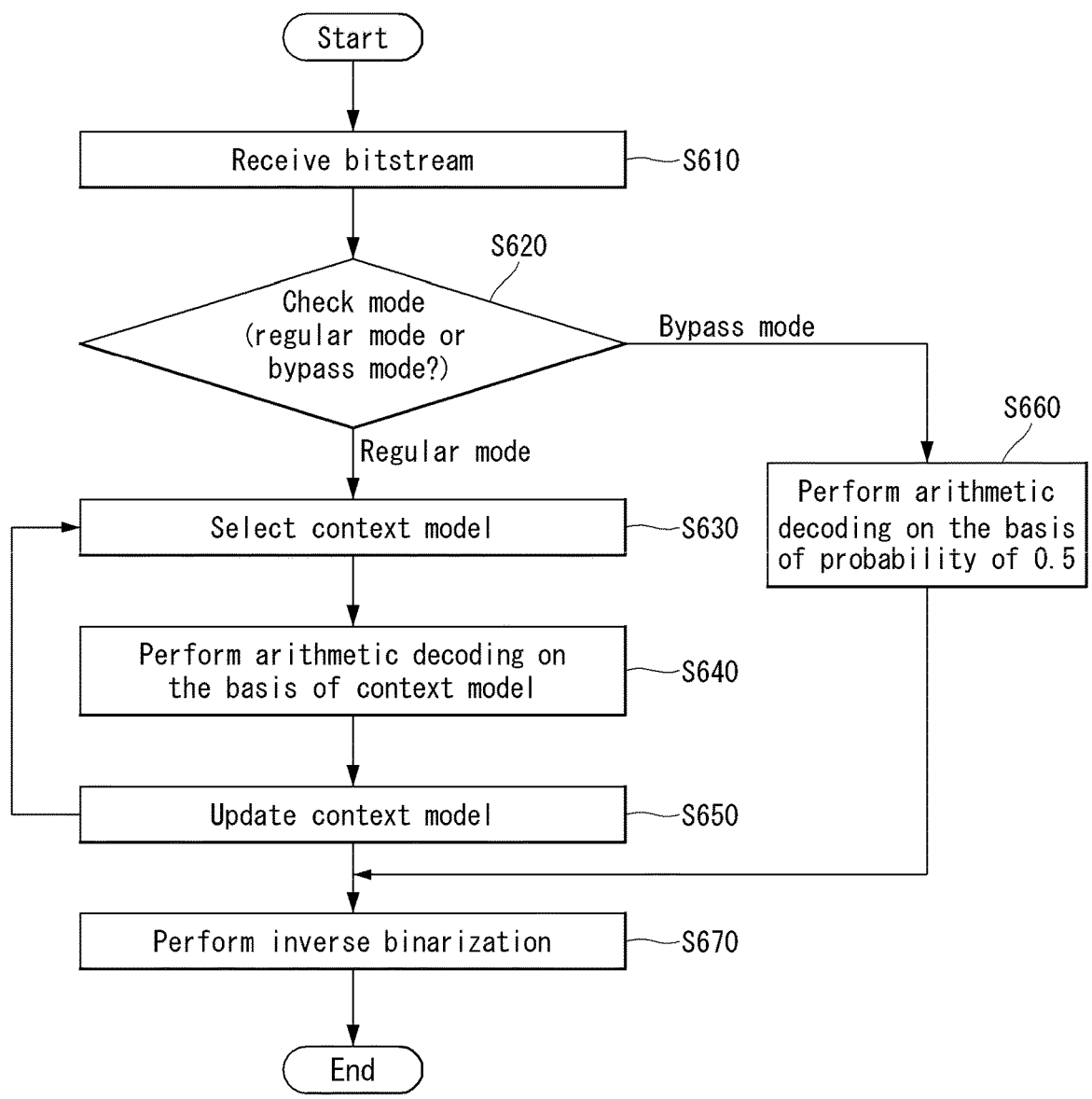
FIG. 6 illustrates a decoding flowchart performed according to Context-based Adaptive Binary Arithmetic Coding (CABAC), as an embodiment to which the present disclosure is applied.

FIG. 6 illustrates a decoding flowchart performed according to Context-based Adaptive Binary Arithmetic Coding (CABAC), as an embodiment to which the present disclosure is applied.

First, a decoder may receive a bit stream (step, S610).

The decoder can check whether the regular mode is applied to the current syntax element or the bypass mode is applied thereto (S620). Here, whether the bypass mode is applied may be determined in advance depending on syntax type.

Further, symbols to which the regular mode is applied and symbols to which the bypass mode is applied may be combined to constitute a syntax element. In this case, the decoder can check whether the bypass mode is applied to symbols of the current syntax element.

When the regular mode is applied as a result of checking in step S620, the decoder can select a context model (S630) and perform binary arithmetic decoding based on the context model (S640). In addition, the decoder can update the context model (S650) and select a suitable context model again based on the context model updated in step S630.

When the bypass mode is applied as a result of checking in step S620, the decoder can perform binary arithmetic decoding based on probability of 0.5 (S660).

The decoder can perform inverse binarization on a decoded bin string (S670). For example, the decoder can receive a decoded bin in the form of binary, convert the decoded bin into a syntax element value in the form of integer and output the syntax element value.

The present disclosure provides a method for coding a region to which a last non-zero transform coefficient belongs from among regions obtained by dividing a transform unit.

In addition, the present disclosure provides a method for coding a region to which a last non-zero transform coefficient belongs from among regions obtained by recursively dividing a transform unit.

Further, the present disclosure provides a method for coding the position of a last non-zero coefficient while adaptively changing coding methods.

Further, the present disclosure provides a method for coding the position of a last non-zero coefficient by applying different coding methods depending on various conditions.

Further, the present disclosure provides a method for coding the position of a last non-zero coefficient using an additional context depending on horizontal and vertical coordinates of the last non-zero coefficient or the size and shape of a transform unit.

Further, the present disclosure provides a method for coding a group to which a last non-zero coefficient belongs from among grouped transform coefficient groups and coding an offset in the corresponding group.

Further, the present disclosure provides a method for coding the position of a last non-zero coefficient in consideration of a case in which the presence of the position of the last non-zero coefficient within a limited region is guaranteed.

According to the methods provided by the present disclosure, it is possible to reduce the amount of data necessary to signal a transform coefficient by effectively encoding positional information of a last non-zero coefficient.

Embodiment 1

In a conventional video encoding standard (e.g., HEVC or JVET), an encoder/decoder encodes/decodes positional information of a last non-zero transform coefficient first in order to encode/decode a residual signal. Here, the encoder/decoder encodes/decodes the position (i.e., horizontal and vertical coordinates) of the last non-zero transform coefficient in a transform block. According to conventional methods, as the size of a transform block increases, a larger number of bits may be required in order to signal a coordinate value of a last non-zero transform coefficient in the transform block, and thus encoding efficiency may decrease.

Accordingly, the present disclosure provides a method for coding a region to which a last non-zero transform coefficient belongs from among regions divided from a transform unit (or an encoding unit) in order to solve the aforementioned problem and efficiently encode positional information about the last non-zero transform coefficient. Here, the last non-zero transform coefficient refers to a non-zero coefficient (i.e., a significant coefficient) positioned at the end in scan order within a current transform unit (or encoding unit) and may be referred to as a last non-zero coefficient, a last significant coefficient, or the like.

Figures 7, 8:
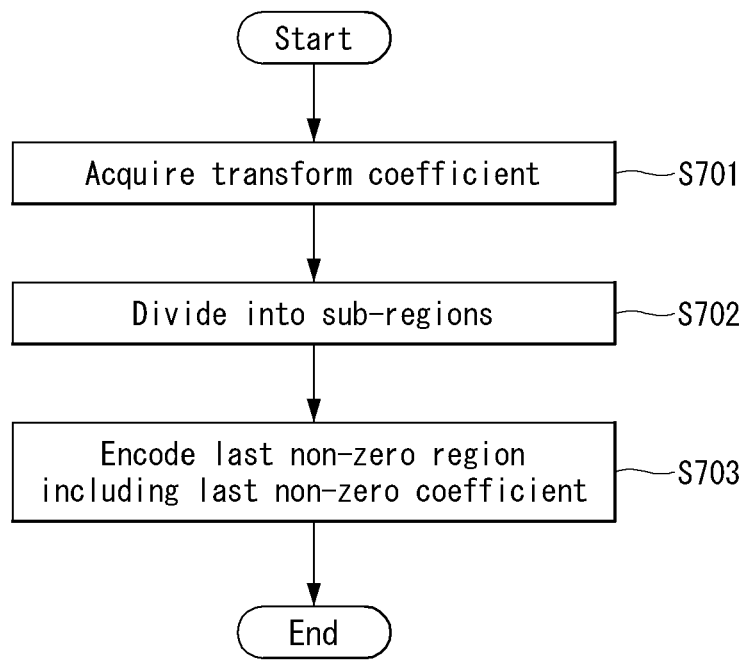
FIG. 7 is a flowchart illustrating a method for encoding positional information of a last non-zero transform coefficient as an embodiment to which the present disclosure is applied.
FIG. 8 illustrates a method for encoding positional information of a last non-zero transform coefficient through recursive division as an embodiment to which the present disclosure is applied.

FIG. 7 is a flowchart illustrating a method for encoding positional information of a last non-zero transform coefficient as an embodiment to which the present disclosure is applied.

Referring to FIG. 7, while the method described in the present embodiment can be equally applied to an encoder and a decoder, description will be made based on the encoder for convenience.

The encoder acquires a transform coefficient of a current block (S701). The encoder can generate a predicted block by performing inter- or intra-prediction. The encoder can generate a residual block of the current block by subtracting the predicted block from the original image. The encoder can generate a transform coefficient by transforming the residual block and generate a quantized transform coefficient by applying quantization to the transform coefficient.

The encoder divides the current block into a plurality of sub-regions (or lower regions) (S702). For example, the encoder can divide the current block into N sub-regions. In this case, sub-regions may be exclusively divided regions or divided regions some or all of which overlap. The current block (or current processing block) may be an encoding unit, an encoding block, a transform unit, a transform block, a predicted unit, a predicted block, or the like.

The encoder encodes a last non-zero region of the current block from among divided sub-regions (S703). Here, the last non-zero region refers to a region including a last non-zero coefficient. For example, when the current block is divided into N sub-regions, the encoder can encode index information (or a syntax element) indicating a sub-region including the last non-zero transform coefficient from among the N sub-regions.

Further, steps S702 and S703 may be recursively (repeatedly) performed. In other words, the encoder can recursively (or repeatedly) divide the region to which the last non-zero transform coefficient belongs into regions having lower depths in order to represent the region as more subdivided regions. The encoder can select a region including a last non-zero coefficient from among the N sub-regions and divide the region including the last non-zero coefficient into N sub-regions (or regions having a lower depth). Recursive division can be performed K times and may be performed until the last non-zero region reaches a pixel unit. This will be described in detail later.

The encoder/decoder may subdivide the last non-zero region into a pixel unit or not. When the last non-zero region is not subdivided into the pixel unit, the encoder/decoder can encode/decode coefficients in a finally determined last non-zero region (i.e., a last non-zero region having a lowest depth). For example, the encoder/decoder can encode/decode the last non-zero region and then encode/decode a significant map (or significant coefficient map) indicating whether each coefficient in the finally determined last non-zero region has a non-zero value. That is, the encoder/decoder can encode/decode the presence or absence of a non-zero coefficient by coding information indicating a final lower region in which the last non-zero coefficient is present and transmitting significant flags with respect to positions for all coefficients in the corresponding region.

In an embodiment, the method for encoding positional information of a last non-zero coefficient through recursive division (e.g., determination of values M, N and K) can be determined depending on the shape or size of the current block (e.g., an encoding block or a transform block). For example, the shape can represent a square block or a non-square block and the size can represent the width and height of the current block or the number of pixels (width*height) in the current block. The method for encoding a last non-zero region (e.g., determination of the values M, N and K) can be defined in advance in the encoder/decoder or signaled from the encoder to the decoder in units of pictures or slices, encoding unit or transform unit.

The method for encoding a last non-zero region provided by the present disclosure can be used along with a conventional method for transmitting positional information in units of pixels (i.e., horizontal and vertical coordinates in a transform unit of a last non-zero transform coefficient).

Hereinafter, the method for encoding positional information of a last non-zero coefficient through recursive division will be described.

Embodiment 2

In an embodiment of the present disclosure, the encoder/decoder can divide a region in which a last non-zero coefficient is present into regions having a lower depth and then code a region including the last non-zero coefficient (i.e., a last non-zero region) from among the regions having the lower depth. Here, a lower depth indicates the number of divisions of the current block (or current transform unit) and depth can increase by 1 whenever the current block with a depth of 0 is divided. The encoder/decoder can code information indicating the last non-zero region from among the regions having the lower depth. The last non-zero region can be further hierarchically divided into regions having a lower depth.

When a set including all pixels (or pixel positions) in the current block is assumed to be P, P can be divided into P(k) as represented by mathematical expression 1.

[Mathematical expression 1]
$$P = \bigcup_{k=1}^{N} P(k), \; P(i) \cap P(j) = \phi, \; i, j = 1,$$
$$\ldots, N, \; i \neq j, \; P(i) \neq \phi, \; i = 1, \ldots, N$$

Referring to mathematical expression 1, P can be divided into P(k) and the depth of P(k) can increase 1. The depth of P(k) is larger than the depth of P by 1. In other words, the depth of P including all pixels in the current block is 0 and the depth of P(k) is 1.

When the current block is recursively divided, P(k) can be further divided into lower regions having a lower depth and the lower regions can be further divided into regions having a lower depth (regions having a depth increasing 1).

A region having a depth of d can be represented by mathematical expression 2.

$$P^d(i_0, i_1, \ldots, i_d) \quad \text{[Mathematical expression 2]}$$

The region represented by mathematical expression 2 belongs to an i_1-th region (or a region identified by i_1) when a current block having a depth of 0 (i_0-th region having the depth of 0) is divided into regions having a depth of 1. The region represented by mathematical expression 2 indicates an i_d-th region (or a region identified by i_d) when the current block is finally divided into regions having a depth of d. Here, the current block having the depth of 0 is an entire region and the value i_d may have a value of 1.

The aforementioned recursive division can be represented by mathematical expression 3.

[Mathematical expression 3]
$$P^d(i_0, i_1, \ldots, i_d) =$$
$$\bigcup_{k=1}^{N^d(i_0, i_1, \ldots, i_d)} P^{d+1}(i_0, i_1, \ldots, i_d, k), \; d \geq 0$$
$$P^{d+1}(i_0, i_1, \ldots, i_d, i) \cap$$
$$P^{d+1}(i_0, i_1, \ldots, i_d, j) = \phi, \; i,$$
$$j = 1, \ldots, N^d(i_0, i_1, \ldots, i_d), \; i \neq j,$$
$$P^{d+1}(i_0, i_1, \ldots, i_d, i) \neq \phi,$$
$$i = 1, \ldots, N^d(i_0, i_1, \ldots, i_d)$$

Referring to mathematical expression 3, a case in which lower regions are exclusively divided is assumed. Here, N^A(d)(i_0, i_1, . . . , i_d) represents the number of lower regions (i.e., regions with a depth of d+1) divided at a depth of d.

When the notations of mathematical expressions 2 and 3 are applied, division of a current block can be represented by mathematical expression 4.

$$P = P^0(i_0), N = N^0(i_0), P(k) = P^1(i_0, k),$$
where $i_0 = 1$ [Mathematical expression 4]

Referring to mathematical expression 4, the current block having a depth of 0 can be divided into N regions having a depth of 1.

When P^(d)(i_0, i_1, . . . , i_d) is not a leaf region, the encoder/decoder can code a code which can distinguish P^(d)(i_0, i_1, . . . , 1) to P^(d)(i_0, i_1, . . . , N^(d-1)(i_0, i_1, . . . , i_(d-1))). Here, the leaf region refers to a region that is not divided any longer in recursive (or hierarchical) division. That is, the encoder/decoder can code a region including a last non-zero transform coefficient for each depth from among regions having a lower depth divided from the current block.

To code recursively divided regions having lower depths, various entropy coding methods can be applied. For example, the encoder/decoder can perform binarization by allocating a binary code to each region and apply binary arithmetic coding to the binary code. Further, when a first region and a second region divided from the current block are divided into a plurality of lower regions, a coding method for identifying lower regions of the first region may differ from a coding method for identifying lower regions of the second region. For example, the encoder/decoder can apply binary arithmetic coding to a code for distinguishing the lower regions of the first region and apply non-binary arithmetic coding to a code for distinguishing the lower regions of the second region.

If a code for distinguishing P^(d)(i_0, i_1, . . . , i_d) that is not a leaf region is s^(d)(i_0, i_1, . . . , i_d) and a code indicating the position q of a last non-zero transform coefficient in a region A that is a leaf region is s(A,q), a code for coding q can be represented by mathematical expression 5.

[Mathematical expression 3]
$$s_q = \left(\prod_{k=1}^{d_q} s^k(i_0, i_1, \ldots, i_k)\right) \cdot$$
$$s\left(p^{d_q}(i_0, i_1, \ldots, i_{d_q}), q\right)$$

Referring to mathematical expression 5, the current block can be divided into regions of a depth d_q and q may belong to the region with the depth of d. Here, the operator Π concatenates codes. q belongs to regions identified by region indexes i_0, i_1, . . . , i_(d_q) at each depth.

FIG. 8 illustrates a method for encoding positional information of a last non-zero transform coefficient through recursive division as an embodiment to which the present disclosure is applied.

Referring to FIG. 8, a case in which a current block is a transform block having a size of 4×4. According to mathematical expression 4, a set P can be represented by mathematical expression 6.

$$P = P^0(1) = \{q_{11}, q_{12}, q_{13}, q_{14}, q_{21}, q_{22}, q_{23},$$
$$q_{24}, q_3, q_{32}, q_{33}, q_{34}, q_{41}, q_{42}, q_{43}, q_{44}\} \quad \text{[Mathematical expression 6]}$$

P^(0)(1) can be divided into 3 regions having a depth of 1 as represented by mathematical expression 7 and each divided region can be allocated a code.

$$P^1(1,1) = \{q_{11}, q_{12}, q_{13}, q_{21}, q_{22}\}, s^1(1,1) = 0$$
$$P^1(1,2) = \{q^{14}, q^{23}, q^{32}, q^{41}\}, s^1(1,2) = 10$$
$$P^1(1,3) = \{q_{24}, q_{33}, q_{34}, q_{42}, q_{43}, q_{44}\},$$
$$s^1(1,3) = 11 \quad \text{[Mathematical expression 7]}$$

In addition, P^(1)(1,1) and P^(1)(1,3) can be respectively divided into 2 regions having a depth of 2 and 3 regions with the depth of 2 as represented by mathematical expression 8 and each divided region can be allocated a code.

$P^2(1,1,1)=\{q_{11}\}, s^2(1,1,1)=0$ $P^2(1,1,2)=\{q_{12},q_{21}\}, s^2(1,1,2)=10$ $P^2(1,1,3)=\{q_{13},q_{22},q_{31}\}, s^2(1,1,3)=11$ $P^2(1,3,1)=\{q_{24},q_{33},q_{42}\}, s^2(1,3,1)=0$ $P^2(1,3,2)=\{q_{34},q_{43},q_{44}\}, s^2(1,3,2)=1$ [Mathematical expression 8]

Here, regions $P^\wedge(1)(1,2)$, $P^\wedge(2)(1,1,1)$, $P^\wedge(2)(1,1,2)$, $P^\wedge(2)(1,1,3)$, $P^\wedge(2)(1,3,1)$ and $P^\wedge(2)(1,3,2)$ can correspond to leaf regions. Codes for the positions of coefficients belonging to the leaf regions can be allocated as represented by mathematical expression 9.

$s(P^1(1,2),q_{14})=00, s(P^1(1,2),q_{23})=01, s(P^1(1,2),q_{32})=10, s(P^1(1,2),q_{41})=11$ $s(P^2(1,1,1),q_{11})=\phi$ $s(P^2(1,1,2),q_{12})=0, s(P^2(1,1,2),q_{21})=1$ $s(P^2(1,1,3),q_{22})=0, s(P^2(1,1,3),q_{13})=10, s(P^2(1,1,3),q_{31})=11$ $s(P^2(1,3,1),q_{33})=0, s(P^2(1,3,1),q_{24})=10, s(P^2(1,3,1),q_{42})=11$ $s(P^2(1,3,2),q_{44})=0, s(P^2(1,3,2),q_{34})=10, s(P^2(1,3,2),q_{43})=11$ [Mathematical expression 9]

Here, the region $P^\wedge(2)(1,1,1)$ is a region divided into a pixel unit and may not be allocated a code for identifying a coefficient at a specific position in the corresponding region.

If codes are allocated as represented by mathematical expressions 7 to 9 and a last non-zero transform coefficient is positioned at q_34, the encoder/decoder can code positional information of the last non-zero transform coefficient as represented by mathematical expression 10.

$s_{q34}=s^1(1,3) \cdot s^2(1,3,2) \cdot s(P^2(1,3,2),q_{34})=$
$11 \cdot 1 \cdot 10=11110$ [Mathematical expression 10]

In mathematical expression 10, the operator·concatenates codes.

The method proposed in the present embodiment can be applied irrespective of the size or shape of a transform block. That is, the method can be applied not only to a case in which the current block is a square block but also to a case in which the current block is a non-square block or a block in any shape.

Embodiment 3

In an embodiment of the present disclosure, the encoder/decoder can divide positional information of a last non-zero transform coefficient into a prefix and a suffix and perform binarization thereon. For example, the encoder/decoder can represent a prefix as a truncated unary code and represent a suffix as a fixed length code.

The encoder/decoder can divide each of the horizontal coordinate (i.e., x coordinate) and the vertical coordinate (i.e., y coordinate) of the last non-zero transform coefficient into a prefix and a suffix and perform binarization thereon. If a prefix is represented as a truncated unary code and a suffix is represented as a fixed length code, the encoder/decoder can group coordinate values and allocate a binary code to each group as shown in Table 1.

TABLE 1

| Position group | | | |
|---|---|---|---|
| Group index | Range | Prefix | Suffix |
| 1 | 0 | 0 | — |
| 2 | 1 | 10 | — |
| 3 | 2-3 | 110 | X |
| 4 | 4-8 | 1110 | XX |
| ... | ... | ... | ... |

When a case in which coordinate values in the current block are divided into N groups is assumed, codes in table 1 can be represented by a parameter set B_k as represented by mathematical expression 11.

$B_k=\{N, P_1, \ldots, P_N, S_1, \ldots, S_N, C_p(i,j)(1 \leq i \leq N, 1 \leq j \leq P_i),$
$C_s(i,j)(1 \leq i \leq N, 1 \leq j \leq S_i)\}$ [Mathematical expression 11]

Here, P_i denotes the length of a prefix code for a group i. S_i denotes the length of a suffix code for the group i. P_i can be determined as represented by mathematical expression 12.

$$P_i = \begin{cases} i, & 1 \leq i \leq N-1 \\ N-1, & i = N \end{cases}$$ [Mathematical expression 12]

In addition, S_i can satisfy S_i≥0.

A regular coding method using a context for each bin (i.e., binary symbol) can be applied to both a prefix code and a suffix code. That is, in mathematical expression 11, C_(p)(i, j) indicates a context index for a j-th bin (i.e., binary symbol) in a prefix for a group i. Here, 1≤i≤N, 1≤j≤P_i and C_(p)(i, j)≥0 can be satisfied. If the number of contexts is N_C and the context index starts from 1, the encoder/decoder can be configured to refer to bypass coding when the context index value is 0.

In addition, in mathematical expression 11, C_(s)(i, j) indicates a context index for a j-th bin in a suffix for the group i. Here, 1≤i≤N, 1≤j≤S_i and C_(s)(i, j)≥0 can be satisfied. If the number of contexts is N_C and the context index starts from 1, the encoder/decoder can be configured to refer to bypass coding when the context index value is 0.

All parameter sets supported in the encoder/decoder can be represented as a set $\Im$ as represented by mathematical expression 13 based on mathematical expression 11.

$\Im = \{B_1, B_2, \ldots, B_{|\Im|}\}$, [Mathematical expression 13]

Referring to mathematical expression 13, the encoder/decoder can support $|\Im|$ parameter sets in order to code the position of a last non-zero transform coefficient.

The aforementioned parameter set may be referred to as a coding parameter, a coding parameter set, a coding method or the like.

In an embodiment of the present disclosure, the encoder/decoder can adaptively determine a specific parameter set from among $|\Im|$ parameter sets in order to code the position of a last non-zero transform coefficient and code the last non-zero transform coefficient using the determined parameter set.

In order to adaptively determine a specific parameter set from among a plurality of parameter sets, the encoder/decoder may store (or include) various parameter sets in advance. Hereinafter, a parameter set will be exemplified.

When a case in which the width or height of a current block is 128 is assumed, the encoder/decoder can allocate a code to the position of each pixel (or coefficient) in the current block as shown in Table 2.

TABLE 2

| Position | prefix Truncated unary | Suffix Fixed length | Suffix Range |
|---|---|---|---|
| 0 | 0 | — | — |
| 1 | 10 | — | — |
| 2 | 110 | — | — |
| 3 | 1110 | — | — |
| 4-5 | 11110 | X | 0 to 1 |
| 6-7 | 111110 | X | 0 to 1 |
| 8-11 | 1111110 | XX | 0 to 3 |
| 12-15 | 11111110 | XX | 0 to 3 |
| 16-23 | 111111110 | XXX | 0 to 7 |
| 24-31 | 1111111110 | XXX | 0 to 7 |
| 32-47 | 11111111110 | XXXX | 0 to 15 |
| 48-63 | 111111111110 | XXXX | 0 to 15 |
| 64-95 | 1111111111110 | XXXXX | 0 to 31 |
| 96-127 | 1111111111111 | XXXXX | 0 to 31 |

Referring to Table 2, the encoder/decoder can group the width of height of the current block into horizontal groups or vertical groups. In addition, the encoder/decoder can map a prefix represented as a truncated unary code to each horizontal group (or vertical group). The encoder/decoder can map a suffix represented as a fixed length code to the position of a coefficient in the horizontal groups (or vertical groups).

In this case, the encoder/decoder can code the prefix in a regular mode using a context and code the suffix in a bypass mode that does not use a context.

In general, the position of a last non-zero coefficient of a transform block in an image may have tendency. Accordingly, such tendency (i.e., bin generation probability) can be effectively reflected by applying the regular mode to prefix coding and simplification and parallelization of implementation can be improved by applying the bypass mode to suffix coding.

The encoder/decoder can map codes such that a suffix length increases to more than 0 from a relatively low group and the suffix length increases more rapidly for the following groups, as shown in Table 3. It is possible to reflect a state in which a last non-zero transform coefficient is frequently positioned in a high-frequency region in a non-square transform block and improve coding efficiency by configuring codes as described above.

TABLE 3

| Position | prefix Truncated unary (regular mode) | suffix Fixed length (bypass mode) | Suffix Range |
|---|---|---|---|
| 0 | 0 | — | — |
| 1 | 10 | — | — |
| 2-3 | 110 | X | 0 to 1 |
| 4-7 | 1110 | XX | 0 to 3 |
| 8-15 | 11110 | XXX | 0 to 7 |
| 16-31 | 111110 | XXXX | 0 to 15 |
| 32-47 | 1111110 | XXXX | 0 to 15 |
| 48-63 | 11111110 | XXXX | 0 to 15 |
| 64-95 | 111111110 | XXXXX | 0 to 31 |
| 96-127 | 111111111 | XXXXX | 0 to 31 |

Further, the encoder/decoder can map codes such that a suffix length increases to more than 0 from a relatively high group, as shown in Table 4. By configuring codes in this manner, it is possible to reflect a state in which a last non-zero transform coefficient is frequently positioned in a low-frequency region and a probability that the last non-zero transform coefficient is positioned in a relatively high-frequency region abruptly decreases.

TABLE 4

| Position | prefix Truncated unary (regular mode) | suffix Fixed length (bypass mode) | Suffix Range |
|---|---|---|---|
| 0 | 0 | — | — |
| 1 | 10 | — | — |
| 2 | 110 | — | — |
| 3 | 1110 | — | — |
| 4 | 11110 | — | — |
| 5 | 111110 | — | — |
| 6-7 | 1111110 | X | 0 to 1 |
| 8-11 | 11111110 | XX | 0 to 3 |
| 12-15 | 111111110 | XX | 0 to 3 |
| 16-23 | 1111111110 | XXX | 0 to 7 |
| 24-31 | 11111111110 | XXX | 0 to 7 |
| 32-47 | 111111111110 | XXXX | 0 to 15 |
| 48-63 | 1111111111110 | XXXX | 0 to 15 |
| 64-95 | 11111111111110 | XXXXX | 0 to 31 |
| 96-127 | 11111111111111 | XXXXX | 0 to 31 |

In addition, the encoder/decoder may configure codes such that a point at which a suffix length increases to more than 0 is maintained and the suffix length starts from 2, as shown in Table 5.

TABLE 5

| Position | prefix Truncated unary (regular mode) | suffix Fixed length (bypass mode) | Suffix Range |
|---|---|---|---|
| 0 | 0 | — | — |
| 1 | 10 | — | — |
| 2 | 110 | — | — |
| 3 | 1110 | — | — |
| 4-7 | 11110 | XX | 0 to 3 |
| 8-15 | 111110 | XXX | 0 to 7 |
| 16-31 | 1111110 | XXXX | 0 to 15 |
| 32-63 | 11111110 | XXXXX | 0 to 31 |
| 64-127 | 111111110 | XXXXXX | 0 to 63 |

Further, the encoder/decoder may apply regular coding instead of bypass coding to the first bin of a suffix, as shown in Table 6.

TABLE 6

| Position | prefix Truncated unary (regular mode) | suffix Fixed length (R: regular mode, X: bypass mode) | Suffix Range |
|---|---|---|---|
| 0 | 0 | — | — |
| 1 | 10 | — | — |
| 2 | 110 | — | — |
| 3 | 1110 | — | — |
| 4-7 | 11110 | RX | 0 to 3 |
| 8-15 | 111110 | RXX | 0 to 7 |
| 16-31 | 1111110 | RXXX | 0 to 15 |
| 32-63 | 11111110 | RXXXX | 0 to 31 |
| 64-127 | 111111110 | RXXXXX | 0 to 63 |

A case in which parameter sets (or coding methods) represented by Table 1, mathematical expressions 12 and 13 have been set (or stored) in advance in the encoder/decoder is assumed. In this case, the encoder/decoder can code a last non-zero transform coefficient using changed parameter sets while adaptively changing parameter sets.

In an embodiment, the encoder/decoder can determine a parameter set of a current block based on a probability distribution of a last non-zero transform coefficient.

For example, when a range of coordinate values in the current block is 1 to W, the encoder/decoder can divide the range of 1 to W into M sections. The encoder/decoder can accumulate a count value of a section in which a last non-zero coefficient is positioned whenever the coordinate value of the last non-zero coefficient is coded. The encoder/decoder can determine a parameter set (or a coding method) of a section having a highest accumulated count value as a parameter set of the current block. Alternatively, the encoder/decoder may calculate (accumulate) probabilities that the last non-zero transform coefficient is positioned in the M sections and then determine a parameter set of a section having a highest probability value. The encoder/decoder can code the position of the last non-zero transform coefficient of the current block using the determined parameter set.

Here, the encoder/decoder may reflect statistics for all previously coded transform units (i.e., Tus), reflect only statistics in a currently coded CTU (or maximum coding unit) or only statistics for CTUs at specific positions (or a specific number of CTUs) from among neighboring CTUs in calculation of a probability for each section.

For example, the encoder/decoder can select a section in which an accumulated probability value or an accumulated count value is greater than a specific threshold from among the M sections and determine a parameter set of the selected section as a parameter set for coding a last non-zero transform coefficient of the current block.

Furthermore, when as many specific sections as a number preset in a coding process are selected, for example, coding can be performed using parameter sets for the corresponding sections. Here, the preset number may be set differently for sections.

Moreover, the encoder/decoder can determine a parameter set of the current block through a state machine method that determines a parameter set as a state. For example, if a state corresponding to a section k from among the M sections is a current state, the encoder/decoder can set a counter variable in a low-frequency direction and a counter variable in a high-frequency direction for each state. The encoder/decoder can increase a counter value in the low-frequency direction when a lower frequency side (i.e., a section with smaller coordinates) than the current section is coded and increase a counter value in the high-frequency direction when a higher frequency side (i.e., a section with larger coordinates) is coded.

When a counter value in the low-frequency direction or the high-frequency direction reaches a specific threshold value, the encoder/decoder can shift the current state in the low-frequency direction or the high-frequency direction according to the increased counter value. If the current section has been coded, both the counter value in the low-frequency direction and the counter value in the high-frequency direction may be reduced. Alternatively, when a section in the low-frequency direction has been coded, the encoder/decoder may increase the corresponding counter value and, simultaneously, decrease the counter value in the high-frequency direction (or low-frequency direction).

In another embodiment, the above-described parameter sets (or coding methods) represented by Table 1, mathematical expressions 12 and 13 may be applied differently depending on various conditions (e.g., a quantization parameter, a block size, a block shape and a prediction mode).

For example, the encoder/decoder can apply different parameter sets depending on block sizes.

In addition, the encoder/decoder can apply different parameter sets, for example, depending on block shapes. For example, the encoder/decoder can apply different parameter sets for a square, a non-square with a longer width, and a non-square with a longer height. Further, the encoder/decoder can apply different parameter sets for cases in which the ratios of the widths to the heights of non-square blocks are 2:1, 4:1, 8:1, 1:2, 1:4 and 1:8. Further, the encoder/decoder can apply different parameter sets depending on block sizes (e.g., widths and heights are 8×4, 16×8 and 32×16) for a non-square block in which a ratio of the width to the height is 2:1.

Further, the encoder/decoder may apply different parameter sets for the width and the height of a current block in the case of a non-square block. For example, in the case of 8×4, 16×8 and 32×16 non-square blocks, the encoder/decoder can apply the same parameter set to longer sides 16, 16 and 32 and apply the same parameter set to shorter sides 8, 4 and 8.

Further, the encoder/decoder may apply different parameter sets only for longer sides or shorter sides from among widths or heights of non-square blocks. For example, in the case of 8×16, 16×4 and 32×8 blocks, the encoder/decoder can apply a separate parameter set to longer sides 16, 16 and 32.

Arbitrary coding methods other than the coding method proposed in Table 1 and mathematical expressions 12 and 13 may be applied as the above-described method for adaptively changing coding methods and the method for applying different coding methods depending on various conditions. In addition, the method for adaptively changing coding methods and the method for applying different coding methods depending on various conditions may be independently applied or combined and applied. For example, when a coding method is adaptively changed using a state machine, the encoder/decoder can set different state machines depending on specific conditions.

In an embodiment, when a horizontal coordinate and a vertical coordinate of a last non-zero transform coefficient are independently coded, the encoder/decoder can be configured to separately share a context set for coding the horizontal coordinate and a context set for coding the vertical coordinate. Here, a context set refers to a set of parameters that can be used to determine a context and may be called a context, a context model or the like. Further, the encoder/decoder may apply separate context sets for a square block, a non-square block with a longer side in the horizontal direction, and a non-square block with a longer side in the vertical direction and apply an individual context set only for a non-square block in which a ratio of the width to the height is a specific value.

Embodiment 4

In an embodiment of the present disclosure, when a current block is a non-square block, the encoder/decoder can divide the current block into sub-regions each of which is composed of a set of a specific number of pixels in order to code the position of a last non-zero transform coefficient. In this case, the specific number can be determined depending on the ratio of the width to the height of the current block. This will be described with reference to the following figure.

Figure 9:
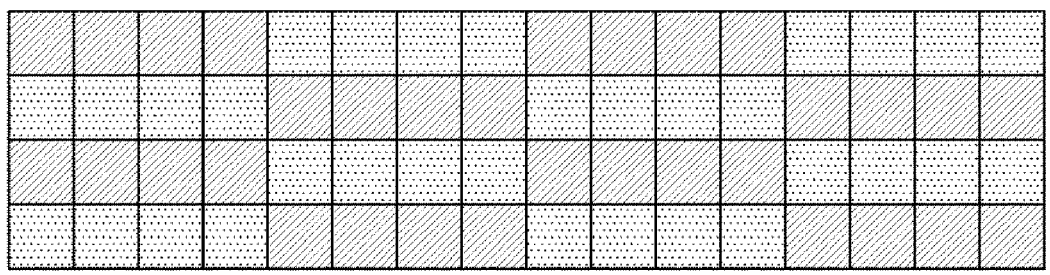
FIG. 9 illustrates a method for encoding positional information of a last non-zero transform coefficient using a super-pixel as an embodiment to which the present disclosure is applied.

FIG. 9 illustrates a method for encoding positional information of a last non-zero transform coefficient using a super-pixel as an embodiment to which the present disclosure is applied.

Referring to FIG. 9, a description will be made on the assumption that a current block is 16×4. Here, the encoder/decoder can divide the current block into super-pixels. Here, a super-pixel refers to a set of a specific number of pixels, and the specific number can be determined by the ratio of the width to the height of the current block. Since the ratio of the width to the height of the current block is 4, a super-pixel can be composed of 4 pixels.

That is, when the position of a last non-zero transform coefficient is coded for a non-square block, one super-pixel can be composed of 4 pixels, as shown in FIG. 9, such that the number of super-pixels in the horizontal direction is the same as the number of super-pixels in the vertical direction in the current block. With this configuration, the encoder/decoder can code a last non-zero region in units of super-pixels and code the position of a last non-zero coefficient as an offset within a super-pixel. For example, when the encoder/decoder codes a last non-zero region in units of super-pixels, the encoder/decoder can code the last non-zero region using the same method as a conventional method for coding a last non-zero coefficient of HEVC.

In addition, the encoder/decoder can code an offset through various methods. For example, when a super-pixel is composed of 4 pixels, the encoder/decoder can allocate codes of 00, 01, 10 and 11 to the positions of the respective pixels. Further, the encoder/decoder can allocate individual contexts to two bins in the allocated codes and then apply regular coding. In addition, the encoder/decoder can allocate different contexts in the horizontal direction and the vertical direction. Further, the encoder/decoder may allocate an individual context for each block size. In another embodiment, the encoder/decoder can apply the super-pixel based coding method only when a width-to-height ratio is a specific ratio (e.g., 1:2 or 2:1).

Embodiment 5

The encoder/decoder can cause a last non-zero transform coefficient to be positioned within a limited region irrespective of a block size under a specific condition. For example, the encoder/decoder can cause a last non-zero transform coefficient to be positioned within a limited region in a current block when the width and the height of the current block are equal to or larger than specific values, the current block is a block coded using inter-prediction (or intra-prediction), or the product of the width and the height of the current block is equal to or larger than a specific value (i.e., the number of pixels in the current block is equal to or greater than a specific number).

In this case, the encoder/decoder can allocate truncated unary prefix code to the limited region. For example, when the presence of a last non-zero transform coefficient only in a 32×32 region at the left top of a 64×128 non-square block is guaranteed, the encoder/decoder can apply truncated unary code limited to 31 for horizontal and vertical coordinate values. In this case, code 111111111 instead of code 1111111110 can be allocated as a prefix for section 24 to 31 in Table 2.

The above-described embodiments 1 to 5 may be independently applied or a plurality of embodiments may be combined and applied.

Figure 10:
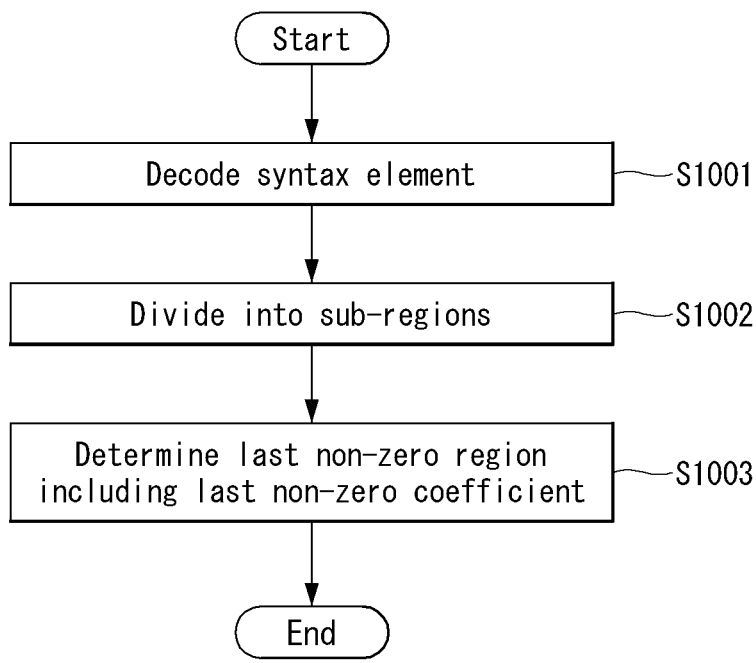
FIG. 10 is a flowchart illustrating a method for decoding positional information of a last non-zero transform coefficient as an embodiment to which the present disclosure is applied.

FIG. 10 is a flowchart illustrating a method for decoding positional information of a last non-zero transform coefficient as an embodiment to which the present disclosure is applied.

A decoder decodes a syntax element indicating a last non-zero region from a bitstream (S1001). Here, the last non-zero region indicates a region including a last non-zero transform coefficient in scan order.

The decoder divides a current block into a plurality of sub-regions (S1002).

As described above, the decoder can divide the current block into the plurality of sub-regions by recursively dividing the current block into regions with lower depths based on a predetermined division method. In this case, the decoder can decode information indicating a region including a last non-zero transform coefficient at each lower depth.

As described above, the decoder can group the width of the current block into a plurality of horizontal groups and group the height of the current block into a plurality of horizontal groups. In this case, the decoder can divide the current block into the plurality of sub-regions based on the horizontal groups and the vertical groups. In addition, the decoder can decode information on a horizontal group or a vertical group which indicates the last non-zero region from among the horizontal groups or the vertical groups.

Further, as described above, a syntax element indicating a last non-zero region can be binarized using truncated unary code and a syntax element indicating the position of a last non-zero transform coefficient region can be binarized using fixed length code. Further, the syntax element indicating the last non-zero region can be decoded in the regular mode using a context and the syntax element indicating the position of the last non-zero transform coefficient region can be decoded in the bypass mode that does not using a context.

Further, as described above, the decoder can adaptively determine a parameter set applied to the current block from among prestored parameter sets. Here, the parameter set may include at least one of a parameter indicating the number of horizontal groups or vertical groups, a parameter indicating the length of code allocated to each group, and a parameter indicating a context index used for code allocated to each group, as represented by mathematical expression 11. The decoder can adaptively determine the parameter set applied to the current block based on a probability distribution of the last non-zero transform coefficient.

Further, as described above, the decoder can divide the current block into a specific number of pixels determined by the ratio of the width to height of the current block when the current block is a non-square block. In addition, when the last non-zero transform coefficient is present in a specific region of the current block, the syntax element can be binarized using truncated unary code allocated within the range of the specific region.

The decoder determines a last non-zero region of the current block from among the sub-regions divided in step S1002 based on the syntax element decoded in step S1001 (S1003).

As described above, the encoder can signal the last non-zero transform coefficient in the last non-zero region to the decoder. Here, the decoder can decode index information indicating the position of the last non-zero transform coefficient in the last non-zero region of the current block.

Figure 11:
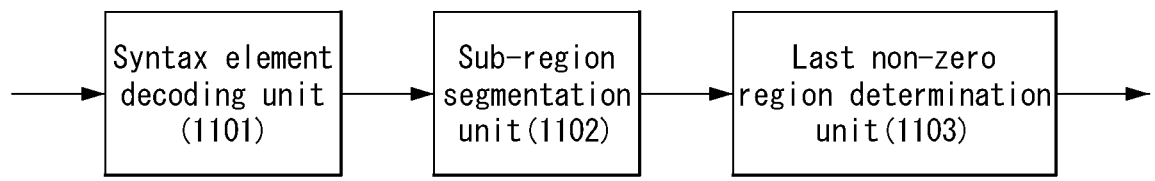
FIG. 11 illustrates a device for decoding positional information of a last non-zero transform coefficient as an embodiment to which the present disclosure is applied.

FIG. 11 illustrates a device for decoding positional information of a last non-zero transform coefficient as an embodiment to which the present disclosure is applied.

Referring to FIG. 11, the decoding device implements the functions, processes and/or methods proposed in FIGS. 6 to 10. Specifically, the decoding device can include a syntax element decoding unit 1101, a sub-region segmentation unit 1102 and a last non-zero region determination unit 1103.

The syntax element decoding unit 1101 decodes a syntax element indicating a last non-zero region from a bitstream.

Here, the last non-zero region indicates a region including a last non-zero transform coefficient in scan order.

The sub-region segmentation unit 1102 divides a current block into a plurality of sub-regions.

As described above, the sub-region segmentation unit 1102 can divide the current block into the plurality of sub-regions by recursively dividing the current block into regions with lower depths based on a predetermined division method. In this case, the sub-region segmentation unit 1102 can decode information indicating a region including a last non-zero transform coefficient at each lower depth.

As described above, the sub-region segmentation unit 1102 can group the width of the current block into a plurality of horizontal groups and group the height of the current block into a plurality of horizontal groups. In this case, the sub-region segmentation unit 1102 can divide the current block into the plurality of sub-regions based on the horizontal groups and the vertical groups. In addition, the last non-zero region determination unit 1103 can decode information on a horizontal group or a vertical group which indicates the last non-zero region from among the horizontal groups or the vertical groups.

Further, as described above, a syntax element indicating a last non-zero region can be binarized using truncated unary code and a syntax element indicating the position of a last non-zero transform coefficient region can be binarized using fixed length code. Further, the syntax element indicating the last non-zero region can be decoded in the regular mode using a context and the syntax element indicating the position of the last non-zero transform coefficient region can be decoded in the bypass mode that does not using a context.

Further, as described above, the last non-zero region determination unit 1103 can adaptively determine a parameter set applied to the current block from among prestored parameter sets. Here, the parameter set may include at least one of a parameter indicating the number of horizontal groups or vertical groups, a parameter indicating the length of code allocated to each group, and a parameter indicating a context index used for code allocated to each group, as represented by mathematical expression 11. The last non-zero region determination unit 1103 can adaptively determine the parameter set applied to the current block based on a probability distribution of the last non-zero transform coefficient.

Further, as described above, the sub-region segmentation unit 1102 can divide the current block into a specific number of pixels determined by the ratio of the width to height of the current block when the current block is a non-square block. In addition, when the last non-zero transform coefficient is present in a specific region of the current block, the syntax element can be binarized using truncated unary code allocated within the range of the specific region.

The last non-zero region determination unit 1103 determines a last non-zero region of the current block from among the divided sub-regions based on the decoded syntax element.

As described above, the encoder can signal the last non-zero transform coefficient in the last non-zero region to the decoder. Here, the decoder can decode index information indicating the position of the last non-zero transform coefficient in the last non-zero region of the current block.

The syntax element decoding unit 1101, the sub-region segmentation unit 1102 and the last non-zero region determination unit 1103 can be configured by being organically combined in order to perform the methods proposed in the present disclosure. For example, syntax element decoding performed by the syntax element decoding unit 1101 and division performed by the sub-region segmentation unit 1102 can be organically performed for each depth.

As described above, the embodiments described in the present disclosure can be implement and performed in a processor, a microprocessor, a controller or a chip. For example, the functional units illustrated in FIGS. 1 to 4 can be implemented and executed in a computer, a processor, a microprocessor, a controller or a chip.

Furthermore, the decoder and the encoder to which the present disclosure is applied can be included in multimedia broadcast transmitting/receiving apparatuses, mobile communication terminals, home cinema video apparatuses, digital cinema video apparatuses, monitoring cameras, video conversation apparatuses, real-time communication apparatuses such as video communication apparatuses, mobile streaming apparatuses, storage media, camcorders, VoD service providing apparatuses, Internet streaming service providing apparatuses, 3D video apparatuses, video telephone apparatuses, medical video apparatuses, etc., and can be used to process video signals and data signals.

Moreover, a processing method to which the present disclosure is applied can be manufactured in the form of program executed by a computer and stored in a computer-readable recording medium. Multimedia data having a data structure according to the present disclosure can also be stored in a computer-readable recording medium. The computer-readable recording medium may include all kinds of recording devices capable of storing data readable by a computer. Examples of the computer-readable recording medium may include a Blu-ray disk (BD), a universal serial bus (USB), a ROM, a RAM, a CD-ROM, magnetic tapes, floppy disks, optical data storage devices, and the like. Further, the computer-readable recording medium also includes a carrier-wave type implementation (for example, transmission over the Internet). Further, a bitstream generated through an encoding method can be stored in a computer-readable recording medium or transmitted through wired/wireless communication networks.

INDUSTRIAL APPLICABILITY

Exemplary aspects of the present disclosure have been described for illustrative purposes and those skilled in the art will appreciate that various modifications, additions and substitutions are possible, without departing from essential characteristics of the disclosure.

The invention claimed is:
1. A method for decoding a video signal, the method comprising:
  checking whether a coding block is divided into a plurality of transform blocks;
  based on the coding block being divided into the plurality of transform blocks, determining a limited region in the coding block based on a width and a height of a transform block of the plurality of transform blocks, wherein a last non-zero transform coefficient is positioned in the limited region;
  obtaining first information regarding a position of the last non-zero transform coefficient within the limited region; and
  decoding the transform block based on the position of the last non-zero transform coefficient,
  wherein the first information is binarized based on a truncated unary code allocated within the limited region.

2. The method of claim 1, further comprising:
obtaining second information representing a last non-zero region, wherein the last non-zero region represents a region including the last non-zero transform coefficient in a scan order;
dividing the coding block into a plurality of sub-regions; and
determining the last non-zero region of the coding block among the plurality of sub-regions based on the second information.

3. The method of claim 2, wherein the coding block is divided into the plurality of sub-regions based on recursively dividing the coding block into regions with lower depths based on a predetermined division method.

4. The method of claim 3, wherein the second information includes information indicating, for each depth, a region including the last non-zero transform coefficient from among the regions with lower depths divided from the coding block.

5. The method of claim 2,
wherein a step of dividing of the coding block into the plurality of sub-regions comprises grouping the width of the coding block into a plurality of horizontal groups and grouping the height of the coding block into a plurality of vertical groups,
wherein the coding block is divided into the plurality of sub-regions based on the horizontal groups and the vertical groups.

6. The method of claim 5, wherein the second information includes information on a horizontal group or a vertical group indicating the last non-zero region from among the horizontal groups or the vertical groups.

7. The method of claim 6,
wherein the first information is binarized based on a truncated unary code and the second information is binarized based on a fixed length code.

8. The method of claim 7, wherein the second information is decoded based on a regular mode using a context and the first information is decoded based on a bypass mode which does not use a context.

9. The method of claim 5, further comprising:
adaptively determining a parameter set applied to the coding block from among prestored parameter sets,
wherein the parameter set includes at least one of a parameter indicating a number of horizontal groups or vertical groups, a parameter indicating a length of code allocated to each group, or a parameter indicating a context index used for code allocated to each group.

10. The method of claim 9, wherein the adaptively determining of a parameter set applied to the coding block comprises determining a parameter set applied to the coding block based on a probability distribution of the position of the last non-zero transform coefficient.

11. The method of claim 2, wherein the coding block is divided into sub-regions composed of a specific number of pixels when the coding block is a non-square block,
wherein the specific number is determined depending on a ratio of the width to the height of the coding block.

12. A device for decoding a video signal, comprising:
a processor configured to
check whether a coding block is divided into a plurality of transform blocks,
based on the coding block being divided into the plurality of transform blocks, determine a limited region in the coding block based on a width and a height of a transform block of the plurality of transform blocks, wherein a last non-zero transform coefficient is positioned in the limited region,
obtain first information regarding a position of the last non-zero transform coefficient within the limited region, and
decode the transform block based on the position of the last non-zero transform coefficient,
wherein the first information is binarized based on a truncated unary code allocated within the limited region.

13. A non-transitory computer readable medium storing a bitstream causing an image decoding apparatus to perform an image decoding method, the image decoding method comprising:
checking whether a coding block is divided into a plurality of transform blocks;
based on the coding block being divided into the plurality of transform blocks, determining a limited region in the coding block based on a width and a height of a transform block of the plurality of transform blocks, wherein a last non-zero transform coefficient is positioned in the limited region;
obtaining first information regarding a position of the last non-zero transform coefficient within the limited region; and
decoding the transform block based on the position of the last non-zero transform coefficient,
wherein the first information is binarized based on a truncated unary code allocated within the limited region.

* * * * *